United States Patent
Mahalank et al.

(10) Patent No.: US 11,140,523 B2
(45) Date of Patent: Oct. 5, 2021

(54) METHODS, SYSTEMS, AND COMPUTER READABLE MEDIA FOR NON-INTERNET PROTOCOL (NON-IP) DATA DELIVERY BETWEEN USER EQUIPMENT (UES) AND MULTIPLE APPLICATION SERVERS (ASS)

(71) Applicant: Oracle International Corporation, Redwood Shores, CA (US)

(72) Inventors: Shashikiran Bhalachandra Mahalank, Bangalore (IN); Sathish Kumar Prabhakaran, Bangalore (IN); Kiranmayi Boyapati, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 101 days.

(21) Appl. No.: 16/656,535

(22) Filed: Oct. 17, 2019

(65) Prior Publication Data

US 2021/0120377 A1    Apr. 22, 2021

(51) Int. Cl.
*H04W 4/08*    (2009.01)
*H04W 76/11*    (2018.01)
(Continued)

(52) U.S. Cl.
CPC ........... *H04W 4/08* (2013.01); *H04L 61/3015* (2013.01); *H04W 76/11* (2018.02); *H04W 84/20* (2013.01)

(58) Field of Classification Search
None
See application file for complete search history.

(56) References Cited

U.S. PATENT DOCUMENTS

2016/0007170 A1    1/2016 Vaidya et al.
2018/0077714 A1*    3/2018 Kodaypak ........... H04L 65/1063
(Continued)

OTHER PUBLICATIONS

Commonly-assigned, co-pending U.S. Appl. No. 17/110,255 for "Methods, Systems, and Computer Readable Media for Providing a Unified Interface Configured to Support Infrequent Data Communications via a Network Exposure Function," (Unpublished, filed Dec. 2, 2020).

(Continued)

*Primary Examiner* — Saumit Shah
(74) *Attorney, Agent, or Firm* — Jenkins, Wilson, Taylor & Hunt, P.A.

(57) ABSTRACT

A method for mobile originated (MO) non-Internet protocol data delivery (NIDD) to plural application servers (ASs) includes creating an AS group NIDD context record at an exposure function node for an AS group including a plurality of ASs to receive MO NIDD communications from a same UE. The method further includes receiving, at the exposure function node, a request for creating a single packet data network (PDN) connection with the exposure function node on behalf of the UE. The method further includes updating the AS group NIDD context record to include PDN connection information for the single PDN connection. The method further includes receiving, at the exposure function node and over the single PDN connection, MO NIDD data from the UE. The method further includes distributing, from the exposure function node and using the AS group NIDD context record, the MO NIDD data to each of the plural ASs identified as members of the group in the AS group NIDD context record.

20 Claims, 7 Drawing Sheets

(51) Int. Cl.
*H04L 29/12* (2006.01)
*H04W 84/20* (2009.01)

(56) References Cited

U.S. PATENT DOCUMENTS

| | | | | |
|---|---|---|---|---|
| 2018/0092133 | A1* | 3/2018 | Starsinic | H04W 4/08 |
| 2018/0192234 | A1* | 7/2018 | Mohamed | H04L 67/2809 |
| 2018/0220256 | A1* | 8/2018 | Kotecha | H04L 67/306 |
| 2020/0146077 | A1* | 5/2020 | Li | H04W 76/10 |
| 2020/0296665 | A1* | 9/2020 | Huang | H04W 52/0209 |
| 2020/0344576 | A1* | 10/2020 | Li | H04W 4/06 |
| 2021/0021672 | A1 | 1/2021 | Shivarajapura et al. | |
| 2021/0120389 | A1* | 4/2021 | Baek | H04L 65/1063 |

OTHER PUBLICATIONS

"3rd Generation Partnership Project; Technical Specification Group Core Network and Terminals; 5G System; Network Exposure Funciton Northbound APIs; Stage 3 (Release 16)," 3GPP TS 29.522, V16.5.0, pp. 1-161 (Sep. 2020).

"3rd Generation Partnership Project; Technical Specification Group Services and System Aspects; System architecture for the 5G System (5GS); Stage 2 (Release 16)," 3GPP TS 23.501, V16.6.0, pp. 1-447 (Sep. 2020).

"3rd Generation Patnership Project; Technical Specification Group Services and Systems Aspects; Procedures for the 5G System (5GS); Stage 2 (Release 16), " 3GPP TS 23.502, V16.6.0, pp. 1-597 (Sep. 2020).

"3rd Generation Partnership Project; Technical Specification Group Core Network and Terminals; T8 reference point for Northbound APIs; (Release 16)," 3GPP TS 29.122, V16.7.0, pp. 1-361 (Sep. 2020).

"3rd Generation Partnership Project; Technical Specification Group Services and System Aspects; Architecture enhancements to facilitate communications with packet data networks and applications (Release 16)," 3GPP TS 23.682, V16.8.0, pp. 1-135 (Sep. 2020).

"3rd Generation Partnership Project; Technical Specification Group Core Network and Terminals; T8 reference point for Northbound APIs (Release 16)," 3GPP TS 29.122 V16.3.0, pp. 1-217 (Sep. 2019).

"3rd Generation Partnership Project; Technical Specification Group Services and System Aspects; Architecture enhancements to facilitate communications with packet data networks and applications (Release 16)," 3GPP TS 23.682 V16.4.0, pp. 1-133 (Sep. 2019).

"3rd Generation Partnership Project; Technical Specification Group Core Network and Terminals; Home Subscriber Server (HSS) diameter interfaces for interworking with packet data networks and applications (Release 15)," 3GPP TS 29.336 V15.7.0, pp. 1-75 (Sep. 2019).

"3rd Generation Partnership Project; Technical Specification Group Core Network and Terminals; Mobility Management Entity (MME) and Serving GPRS Support Node (SGSN) interfaces for interworking with packet data networks and applications (Release 16)," 3GPP TS 29.128 V16.0.0, pp. 1-51 (Sep. 2019).

"3rd Generation Partnership Project; Technical Specification Group Services and System Aspects; General Packet Radio Service (GPRS) enhancements for Evolved Universal Terrestrial Radio Access Network (E-UTRAN) access (Release 16)," 3GPP TS 23.401 V16.4.0, pp. 1-424 (Sep. 2019).

Commonly-assigned, co-pending U.S. Appl. No. 16/546,227 for "Methods, Systems, and Computer Readable Media for Group Device Triggering for Internet of Things (IoT) Devices," (Unpublished, filed Aug. 20, 2019).

Commonly-assigned, co-pending U.S. Appl. No. 16/516,238 for "Methods, Symptoms, and Computer Readable Media for Resource Optimization in Group Message Delivery for Narrowband Internet of Things (NB-IoT) Devices," (Unpublished, filed Jul. 18, 2019).

"3rd Generation Partnership Project; Technical Specification Group Radio Access Network; Evolved Universal Terrestrial Radio Access Network (E-UTRAN); S1 Application Protocol (S1AP) (Release 15)," 3GPP TS 36.413 V15.6.0, pp. 1-388 (Jul. 2019).

"3rd Generation Partnership Project; Technical Specification Group Core Network and Terminals; T8 reference point for Northbound APIs (Release 16)," 3GPP TS 29.122 V16.2.0, pp. 1-309 (Jun. 2019).

"3rd Generation Partnership Project; Technical Specification Group Core Network and Terminals; Mobile Application Part (MAP) specification (Release 15)," 3GPP TS 29.002 V15.5.0, pp. 1-1024 (Jun. 2019).

"3rd Generation Partnership Project; Technical Specification Group Services and System Aspects Architecture enhancements to facilitate communications with packet data networks and applications (Release 16)," 3GPP TS 23.682 V16.3.0, pp. 1-132 (Jun. 2019).

"3rd Generation Partnership Project; Technical Specification Group Radio Access Network; Evolved Universal Terrestrial Radio Access (E-UTRA); Radio Resource Control (RRC); Protocol specification (Release 15)," 3GPP TS 36.331 V15.6.0, pp. 1-960 (Jun. 2019).

"3rd Generation Partnership Project; Technical Specification Group Core Network and Terminals; Home Subscriber Server (HSS) diameter interfaces for interworking with packet data networks and applications (Release 15)," 3GPP TS 29.336 V15.6.0, pp. 1-75 (Mar. 2019).

"3rd Generation Partnership Project; Technical Specification Group Core Network and Terminals; Mobility Management Entity (MME) and Serving GPRS Support Node (SGSN) interfaces for interworking with packet data networks and applications (Release 15)," 3GPP TS 29.128 V15.5.0, pp. 1-52 (Mar. 2019).

"3rd Generation Partnership Project; Technical Specification Group Core Network and Terminals; Tsp interface protocol between the MTC Interworking Function (MTC-IWF) and Service Capability Server (SCS) (Release 15)," 3GPP TS 29.368 V15.0.0 pp. 1-33 (Jun. 2018).

"3rd Generation Partnership Project; Technical Specification Group Core Network and Terminals; Diameter-based T4 interface for communications with packet data networks and applications (Release 15)," 3GPP TS 29.337 V15.0.0, pp. 1-24 (Jun. 2018).

Non-Final Office Action for U.S. Appl. No. 16/546,227 (dated Jun. 14, 2021).

* cited by examiner

METHODS, SYSTEMS, AND COMPUTER READABLE MEDIA FOR NON-INTERNET PROTOCOL (NON-IP) DATA DELIVERY BETWEEN USER EQUIPMENT (UES) AND MULTIPLE APPLICATION SERVERS (ASS)

TECHNICAL FIELD

The subject matter described herein relates to communication between UE devices, such as Internet of Things (IoT) devices, and ASs. More particularly, the subject matter described herein relates to mobile originated (MO) non-IP data from UEs to ASs via a service capability exposure function (SCEF) or network exposure function (NEF), where the ASs communicate directly with the SCEF or NEF or indirectly through an intermediate service capability server (SCS).

BACKGROUND

Many UE devices, such as IoT devices, may not implement complete IP protocol stacks for communicating with the network. For such devices, Third Generation Partnership Project (3GPP) standards define a procedure referred to as non-IP data delivery for the devices to attach to and communicate with the network. For example, Section 4.5.14 of 3GPP TS 23.682 defines NIDD procedures for communicating with UE devices. Communications from the network to a UE are referred to as mobile terminated communications. Communications from a UE to the network are referred to as mobile originated communications. Non-IP data delivery is used for communications between ASs and UEs. For example, a UE may be an IoT device, such as a sensor, that has data to be delivered to an application implemented on a 3GPP AS.

According to 3GPP TS 23.682, one mechanism for communication between an SCS/AS and a UE is via an SCEF over a packet data network (PDN) connection. The PDN connection is between the SCEF and the mobility management entity (MME) serving the radio access network node to which the UE is attached.

The communication between a UE and an AS is referred to in 3GPP standards as machine type communications. 3GPP machine type communication procedures mandate a PDN connection per AS for communication between UE and SCS/AS for data communication. Multiple ASs communicating with the same UE require the UE to establish a dedicated PDN connection towards the SCEF for each of the individual ASs. Requiring a PDN connection from the same UE to each AS results in redundant core network signaling to establish, maintain, and tear down each PDN connection. The interface between the SCEF and the MME over which the PDN connection is established is referred to as the T6a interface. PDN connection establishment procedures on the T6a interface require the exchange of Diameter connection management request (CMR) messages. The exchange of such messages for each PDN connection for multiple ASs communicating with the same UE unnecessarily increases core network traffic between the MME and the SCEF. In addition, when the UE has mobile originated data to send to the ASs, the data is replicated and transmitted over each of the PDN connections, further wasting core network resources. Resources are also unnecessarily used at the UE, radio access network node (evolved nodeB (eNB) or gnodeB (gNB)), MME, and SCEF to maintain context information for the multiple PDN connections.

Accordingly, in light of these and other difficulties, there exits a need for improved methods, systems, and computer readable media for NIDD communications between multiple ASs and a UE.

SUMMARY

A method for mobile originated (MO) non-Internet protocol data delivery (NIDD) to plural application servers (ASs) includes creating an AS group NIDD context record at an exposure function node for an AS group including a plurality of ASs to receive MO NIDD communications from a same UE. The method further includes receiving, at the exposure function node, a request for creating a single packet data network (PDN) connection with the exposure function node on behalf of the UE. The method further includes updating the AS group NIDD context record to include PDN connection information for the single PDN connection. The method further includes receiving, at the exposure function node and over the single PDN connection, MO NIDD data from the UE. The method further includes distributing, from the exposure function node and using the AS group NIDD context record, the MO NIDD data to each of the plural ASs identified as members of the group in the AS group NIDD context record.

According to another aspect of the subject matter described herein, the exposure function node comprises a service capability exposure function (SCEF).

According to yet another aspect of the subject matter described herein, the exposure function node comprises a network exposure function (NEF).

According to yet another aspect of the subject matter described herein, creating the AS group NIDD context record comprises configuring the exposure function node with identities of the ASs that desire to communicate with the same UE. The method for MO NIDD data delivery further includes receiving, from each of the plurality of ASs, an NIDD configuration request message, assigning one of the ASs to be a group leader, resolving an external group identifier in the NIDD configuration request for the AS assigned to be the group leader into an external identifier for the UE, and storing the external identifier for the UE in the AS group NIDD context record in an AS group NIDD context database maintained by the exposure function node.

According to yet another aspect of the subject matter described herein, updating the AS group NIDD context record comprises extracting, from the request for creating the single PDN connection, an evolved packet system (EPS) bearer ID for identifying the PDN connection, and storing the EPS bearer ID in the AS group NIDD context record.

According to yet another aspect of the subject matter described herein, receiving the MO NIDD data from the UE includes receiving a single NIDD submit request message from a mobility management entity (MME), a serving general packet radio service support node (SGSN), or a session management function (SMF).

According to yet another aspect of the subject matter described herein, distributing the MO NIDD data using the AS group NIDD context record comprises extracting an evolved packet system (EPS) bearer ID from a message carrying the MO NIDD data, accessing the AS group NIDD context record using the EPS bearer ID extracted from the message carrying the MO NIDD data, extracting, from the AS group NIDD context record, address information for each of the ASs in the AS group, and transmitting an MO NIDD indication message containing the MO NIDD data to each of the ASs using the address information extracted from the AS group NIDD context record.

According to yet another aspect of the subject matter described herein, the ASs in the AS group include at least one AS that is directly connected to the exposure function node without an intermediate service capability server (SCS).

According to yet another aspect of the subject matter described herein, the ASs in the AS group include at least one AS that is connected to the exposure function node via an intermediate service capability server (SCS).

According to yet another aspect of the subject matter described herein, the method for distributing the MO NIDD data to plural ASs includes determining that one of the ASs in the AS group is unavailable, buffering the MO NIDD data at the exposure function node, and reattempting delivery of the MO NIDD data to the one AS.

According to yet another aspect of the subject matter described herein, a system for distributing MO NIDD to plural ASs is provided. The system includes an exposure function node including at least one processor and a memory. The system further includes an AS group NIDD data distributor and context manager implemented by the at least one processor for creating an AS group NIDD context record at the exposure function node for an AS group including a plurality of ASs to receive MO NIDD communications from a same UE, receiving a request for creating a single packet data network (PDN) connection with the exposure function node on behalf of the UE, updating the AS group NIDD context record to include PDN connection information for the single PDN connection, receiving, over the single PDN connection, MO NIDD data from the UE, and, distributing, from the exposure function node and using the AS group NIDD context record, the MO NIDD data to each of the plural ASs identified as members of the group in the AS group NIDD context record.

According to yet another aspect of the subject matter described herein, the AS group NIDD data distributor and context manager is configured to store identities of the ASs that desire to communicate with the same UE, receive, from each of the plurality of ASs, an NIDD configuration request message, assign one of the ASs to be a group leader, resolve an external group identifier in the NIDD configuration request for the AS assigned to be the group leader into an external identifier for the UE, and store the external identifier for the UE in the AS group NIDD context record in an AS group NIDD context database maintained by the exposure function node.

According to yet another aspect of the subject matter described herein, the AS group NIDD data distributor and context manager is configured to extract, from the request for creating the single PDN connection, an evolved packet system (EPS) bearer ID for identifying the PDN connection and store the EPS bearer ID in the AS group NIDD context record.

According to yet another aspect of the subject matter described herein, the AS group NIDD data distributor and context manager is configured to receive a single NIDD submit request message from a mobility management entity (MME), a serving general packet radio service support node (SGSN), or an session management function (SMF).

According to yet another aspect of the subject matter described herein, The AS group NIDD data distributor and context manager is configured to extract an evolved packet system (EPS) bearer ID from a message carrying the MO NIDD data, access the AS group NIDD context record using the EPS bearer ID extracted from the message carrying the MO NIDD data, extract, from the AS group NIDD context record, address information for each of the ASs in the AS group, and transmit an MO NIDD indication message containing the MO NIDD data to each of the ASs using the address information extracted from the AS group NIDD context record.

According to yet another aspect of the subject matter described herein, the network exposure function is configured to connect directly to at least one of the ASs in the group of ASs without an intermediate service capability server (SCS).

According to yet another aspect of the subject matter described herein, the network exposure function node is configured to connect to at least one of the ASs in the group of ASs via an intermediate service capability server (SCS).

According to yet another aspect of the subject matter described herein, the AS group NIDD data distributor and context manager is configured to determine that one of the ASs in the AS group is unavailable, buffer the MO NIDD data at the exposure function node, and reattempt delivery of the MO NIDD data to the one AS.

According to yet another aspect of the subject matter described herein, a non-transitory computer readable medium having stored thereon executable instructions that when executed by a processor of a computer control the computer to perform steps is provided. The steps include creating an application server (AS) group non-Internet protocol data delivery (NIDD) context record at an exposure function node for an AS group including a plurality ASs to receive MO NIDD communications from a same UE. The steps further include receiving, at the exposure function node, a request for creating a single packet data network (PDN) connection with the exposure function node on behalf of the UE. The steps further include updating the AS group NIDD context record to include PDN connection information for the single PDN connection. The steps further include receiving, at the exposure function node and over the single PDN connection, MO NIDD data from the UE. The steps further include distributing, from the exposure function node and using the AS group NIDD context record, the MO NIDD data to each of the plural ASs identified as members of the group in the AS group NIDD context record.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

The subject matter described herein relates to communication between ASs and UEs, such as IoT devices. There are many real time IoT use cases where multiple IoT ASs will be required to communicate with the same IoT device. For example, if the IoT device is a pollution sensor or a weather sensor, the pollution or weather sensor may be required to communicate the same data to multiple IoT application servers. Using the 3GPP architecture described above in 3GPP TS 23.682, communicating such data from the sensor to each application server requires that the sensor establish a dedicated PDN connection towards the SCEF for each application server. As will be described in detail below, in the 3GPP core network, an application server can communicate directly with the SCEF or indirectly with the SCEF through an intermediate service capability server (SCS). In either case, requiring a separate PDN connection for each application server or SCS/AS can lead to unnecessary resource consumption at both the UE and the network (RAN, core nodes, such as the MME and SCEF to maintain the additional PDN connections). Also, additional RAN and core network signaling is required to send the same message from the sensor to multiple SCS/ASs.

The subject matter described herein allows a UE, such as an IoT device, to communicate with multiple ASs by sending a single NIDD MT message towards the SCEF. The UE establishes a single PDN connection towards the SCEF for 4G networks or the network exposure function (NEF) for 5G networks. The single PDN connection established with the SCEF or NEF is shared by multiple SCS/ASs, multiple ASs, or a combination of SCS/ASs and ASs, instead of having a dedicated PDN connection for each SCS/AS or AS. All or a group of plural SCS/ASs and ASs communicate messages to the same UE device using a single PDN connection for MT NIDD messages. The UE sends a single MO NIDD message to the SCEF or NEF using the single PDN connection, and the SCEF or NEF forks the MO NIDD message to multiple SCS/ASs, ASs, or a combination of SCS/ASs and ASs.

Figure 1:
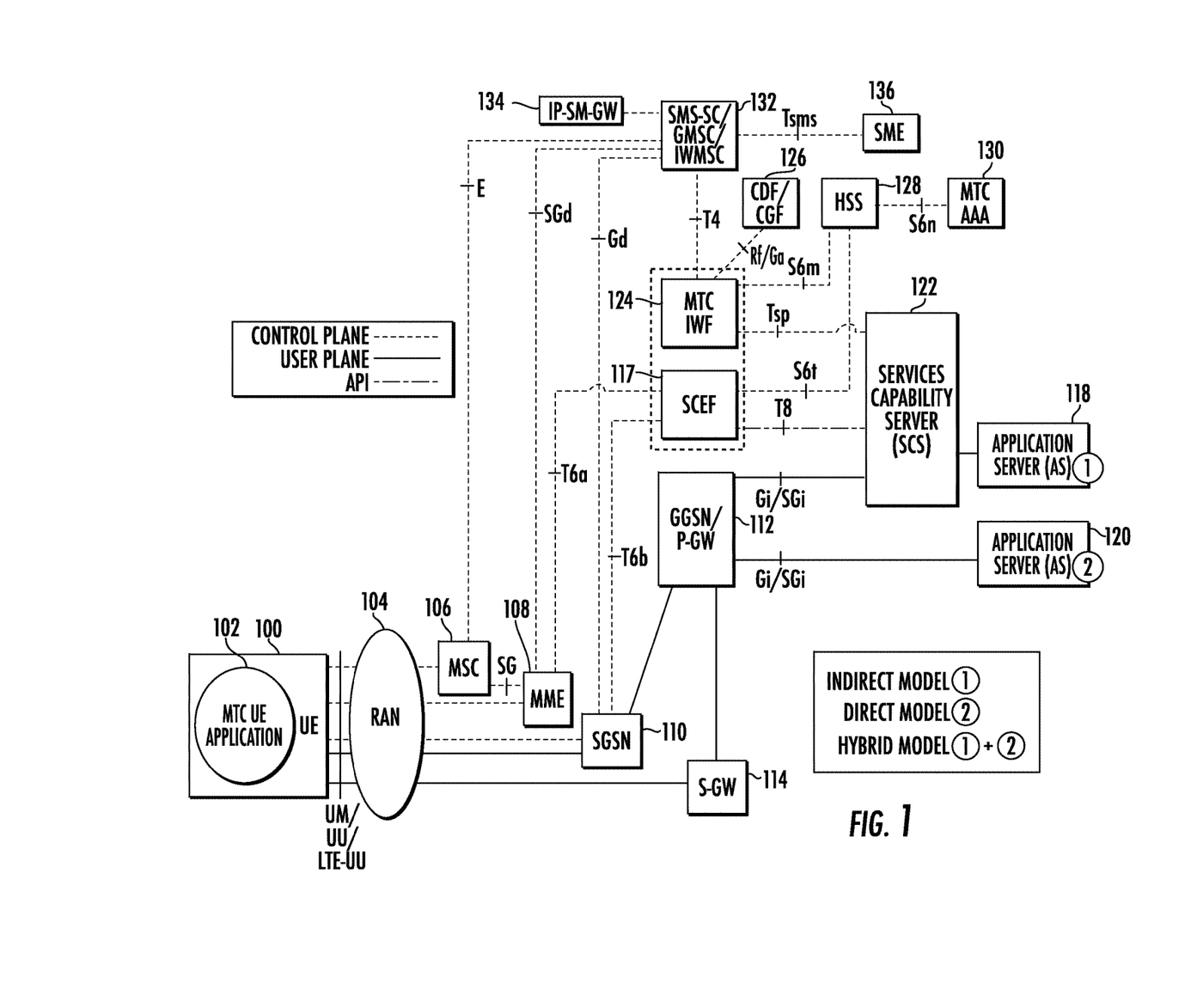
FIG. 1 is a network diagram illustrating exemplary network components for communicating with UEs, such as IoT devices.

FIG. 1 is a network diagram illustrating an exemplary 3GPP-defined network architecture for communicating between UE devices and application servers. The architecture illustrated in FIG. 1 is defined in 3GPP TS 23.682. In FIG. 1, the architecture includes UEs 100, which may include machine type communications (MTC) UE applications 102. Thus, UE 100 may be an IoT device, such as a sensor. UE 100 may not implement a full TCP/IP protocol stack. As a result, it may be desirable to communicate with UE 100 using non-IP data delivery or NIDD. The subject matter described herein includes a methodology and a system for communicating between a UE and multiple application servers using a single PDN connection for both mobile originated and mobile terminated communications.

UE 100 connects to the core network via radio access network (RAN) 104. RAN 104 may be the evolved universal terrestrial radio access network (E-UTRAN), the new radio (NR) network, or a combination thereof. The node in radio access network 104 that provides radio connectivity to 2G and 3G UE devices is referred to as the base station. For 4G UEs, the node in radio access network 104 that provides radio network connectivity to the UEs is referred to as the evolved node B (ENB). For 5G-capable UEs, the node that provides NR connectivity to the devices is referred to as the gNode B (gNB). RAN 104 is intended to represent one or more base stations, eNBs, and gNBs.

Mobile switching center (MSC) 106 performs mobility management functions for 2G and 3G UE devices. Mobility management entity (MME) 108 performs mobility management functions for 4G capable UE devices. Mobility management functions performed by MSC 106 or MME 108 may include receiving mobile device registrations, communicating mobile subscriber registration and location information to home location register (HLR) or home subscriber server (HSS) 128, and communicating with the nodes in RAN 104 with which UEs are attached to the network. For 5G networks, the radio access and PDU session management function for non-IP data delivery are performed by a session management function (SMF).

Serving general packet radio service support node (SGSN) 110 handles packet data communications with mobile users in the network. SGSN 110 functions as the service access point to the GPRS network for the mobile user. On the other side, SGSN 110 communicates with gateway GPRS support node/packet gateway (GGSN/PGW) 112, which can function as the policy enforcement point for packet data communications with mobile users. A policy and charging rules function (PCRF) (not shown in FIG. 1) may perform policy and charging functions for mobile users and devices. The PCRF may include a policy data store that stores policies to be applied to mobile users and devices, such as IoT devices. The policies may be installed in a policy enforcement point, such as GGSN/PGW 112 to enforce policies for network usage and charging. A signaling gateway (SGW) 114 performs signaling protocol conversions to set up bearer communications with mobile users.

Exposure function node 116 includes an SCEF function 117 and a machine type communications interworking function (MTC-IWF) 124. SCEF function 117, on the application side, provides an interface for application servers, such as application servers (ASs) 118 and 120 and service capability server (SCS) 122 to communicate with the network. Exposure function node 116, in one example, is the node that supports communicating with plural UEs using a single PDN connection. In a direct communication model, application servers 118 and 120 may communicate directly with GGSN/PGW 112. In an indirect communication model, application servers 118 and 120 may communicate with the network via SCS 122 and exposure function node 116. It should also be noted that application servers 118 and 120 may communicate directly with exposure function node 116.

In 4G networks, MTC-IWF 124 facilitates communication with IoT devices that do not have IP communications capabilities. A charging data function/charging gateway function (CDF/CGF) 126 generates billing records for network usage. Home subscriber server (HSS) 128 stores subscription and location information for UE devices. In one example, HSS 128 may also be configured with mappings used by SCEF 116 or another node to translate an external group ID into individual IoT device identifiers, such as international mobile subscriber identifiers (IMSIs). A machine type communications authentication authorization and accounting (MTC AAA) server 130 performs AAA functions for MTC devices.

The network architecture may include a short message service center/gateway message service center/interworking message service center (SMSC/GMSC/IWMSC) 132 for generating and delivering SMS messages to IoT devices. An IP short message gateway (IP-SM-GW) 134 may convert IP messages to SMS messages and vice versa. A short message entity (SME) 136 sends and receives SMS messages.

Figure 2:
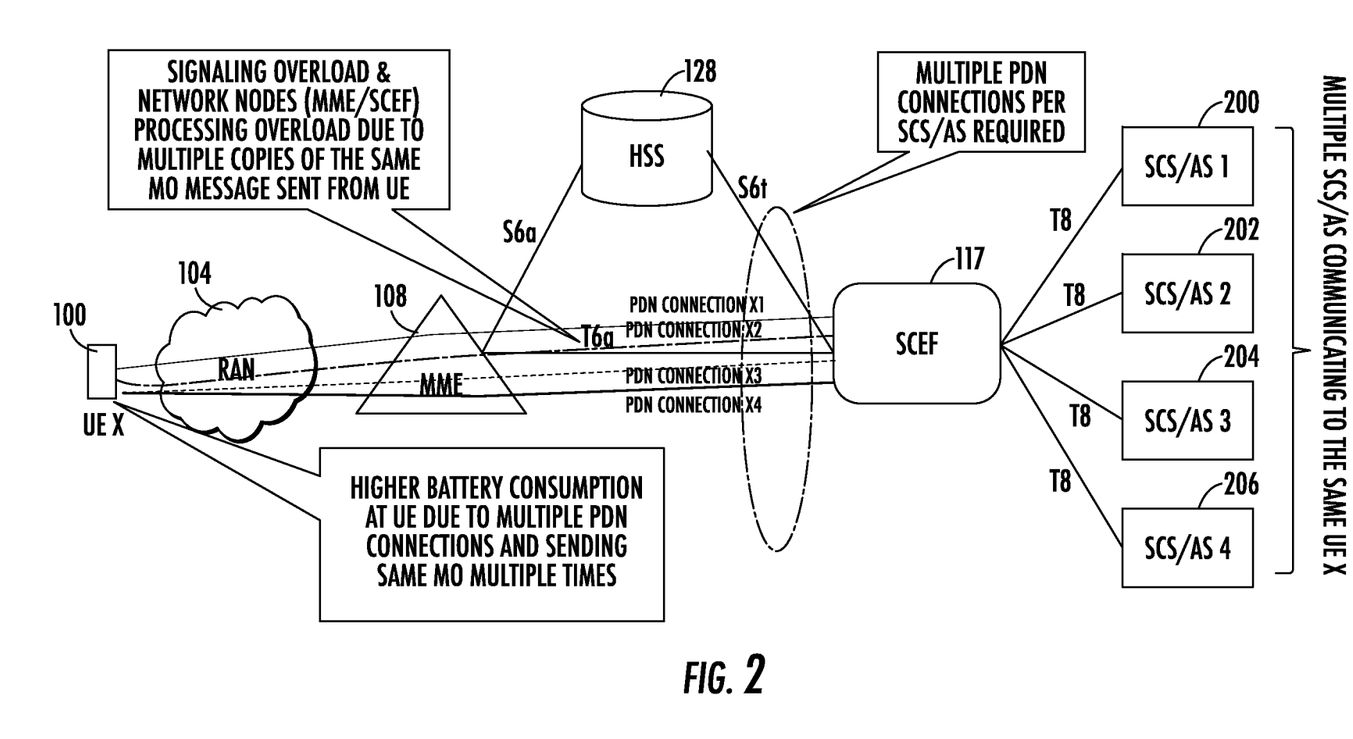
FIG. 2 is a network diagram illustrating existing methods for communication between multiple ASs and a UE using multiple PDN connections.

FIG. 2 illustrates the unnecessary PDN connections and resource utilization resulting when a dedicated PDN connection is required for each SCS/AS in the network. Referring to FIG. 2, UE 100 may be a sensor device that communicates the same data to multiple SCS/ASs 200, 202, 204, and 206 via RAN 104, MME 108, and SCEF 117. In the illustrated example, UE 100 communicates the same data to four SCS/ASs 200, 202, 204, and 206. As a result, four dedicated PDN connections are required from UE 100, through RAN 104 and MME 108, and to SCEF 117. Each of the dedicated PDN connections carries signaling and data between UE 100 and one of SCS/ASs 200, 202, 204, and 206. Using a dedicated PDN connection for each SCS/AS 200, 202, 204, and 206 unnecessarily consumes battery life of UE 100. In addition, resources of RAN 104, MME 108 and SCEF 117 are unnecessarily consumed by the duplicate signaling sent over the separate PDN connections.

Figure 3:
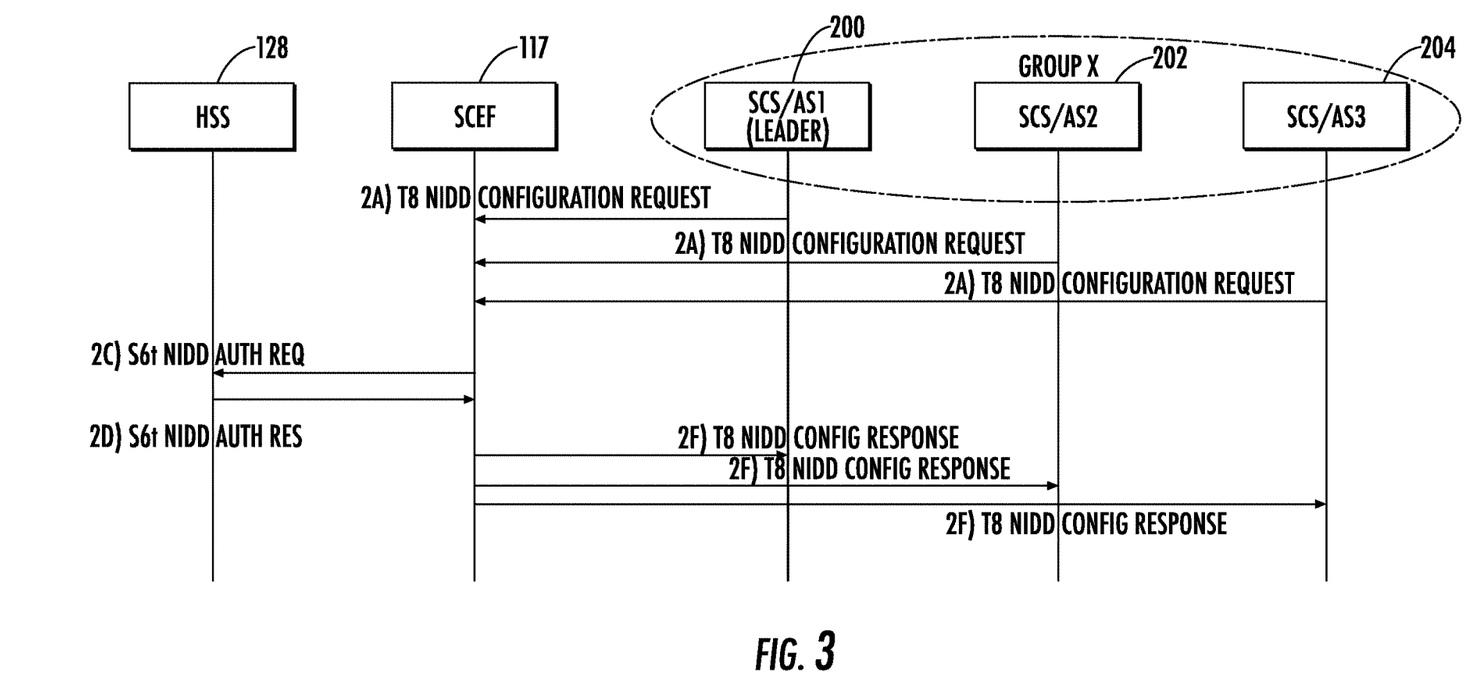
FIG. 3 is call flow diagram illustrating exemplary messaging for configuring a service capability exposure function to support communication between multiple ASs and a UE using a single PDN connection.

As stated above, the subject matter described herein provides for communication between a UE and multiple application servers using a single PDN connection. FIG. 3 is a call flow diagram illustrating exemplary signaling that may be used to enable non-IP data delivery (NIDD) communications from a UE to multiple application servers over a single PDN connection. In the illustrated example, the application servers AS1-AS3 are each co-located with an SCS to form SCS/AS1 200, SCS/AS2 202 and SCS/AS3 204. However, the methodology described herein is not limited to communicating with application servers via an SCS. Communicating with an application server directly connected to an SCEF or NEF without an intermediate SCS is intended to be within the scope of the subject matter described herein.

Prior to the call flow illustrated in FIG. 3, it is assumed that SCEF 117 is configured with the identities of a group of application servers that desire to communicate with the same UE. In the illustrated example, application servers SCS/AS1 200, SCS/AS2 202, and SCS/AS3 204 may be application servers of the same type (such as weather system servers) that require sensor data from the same weather sensor. As a result, the operator of SCEF 117 may configure SCEF 117 to recognize SCS/AS1 200, SCS/AS2 202, and SCS/AS3 204 as being members of the same group (Group X in FIG. 2) for the purpose of communicating with a particular UE device. The configuration may be stored in memory of SCEF 117 such that when SCEF 117 receives NIDD configuration request messages from each group member for establishing NIDD communications, SCEF 117 recognizes the configuration request messages as being for the same group of application servers for communicating with the same UE and creates an AS group UE context record for the application servers.

SCEF 117 may also be configured to recognize one of SCS/ASs 202, 204, and 206 as the group leader, which is the SCS/AS with the longest NIDD duration. The NIDD duration is the duration that the UE communicates with the SCS/AS. Making the SCS/AS with the longest NIDD duration the group leader ensures that the group NIDD configuration is not deleted until the longest NIDD duration among group members expires. In one example, the SCS/AS that is configured as the group leader may be an SCS/AS operated by the same network operator as SCEF 117. The NIDD duration is a parameter specified by the SCS/AS in an NIDD configuration request message.

Referring to the call flow illustrated in FIG. 3, in step 2A, all SCS/AS servers of a given group send NIDD configuration requests to SCEF 117. The NIDD configuration requests each contain an external Group Identifier, External Identifier or mobile station integrated services digital network (MSISDN) number, SCS/AS Identifier, NIDD Duration, T8 Destination Address, T8 long term reference identifier (TLTRI) (only for update/delete), Requested Action, PDN Connection Establishment Option, Reliable Data Service Configuration, MTC Provider Information) for a given UE to SCEF 117 over the T8 interface as defined in 3GPP TS 23.682. The NIDD configuration requests are sent before the UE establishes a PDN connection towards SCEF 117.

In step 2B, SCEF 117 receives the NIDD configuration request messages, recognizes the configuration request messages as being associated with SCS/ASs of the same group, and stores a list of SCS/AS identifiers and NIDD duration for each of the SCS/ASs in an AS group NIDD configuration record in an AS group NIDD context database maintained by SCEF 117. As stated above, SCEF 117 assigns the SCS/AS with the highest NIDD duration to be the leader within the SCS/AS group.

In step 2C, SCEF 117 generates a single NIDD authorization request instead of multiple requests towards HSS 128. The NIDD authorization request message will contain the highest NIDD duration received from the SCS/ASs in the NIDD configuration request messages. The NIDD authorization request message will also contain the external identifier or MSISDN and the access point name (APN) for a given UE or UE group with which the SCS/ASs desired to communicate. The NIDD authorization request message will be sent to HSS 128 over the S6t interface or reference point.

In step 2D, HSS 128 examines the NIDD authorization request message, e.g., with regard to the existence of external identifier or MSISDN and maps the external identifier to an IMSI and/or MSISDN of the UE with which the SCS/AS desires to communicate. If this check fails, the HSS follows step 2F and provides a result indicating the reason for the failure condition to the SCEF. In FIG. 2, it is assumed that the check passes, and, as such, HSS 128 sends a single NIDD authorization response message to SCEF 117 over the T8 interface. The NIDD authorization response contains a single IMSI or a list of IMSIs and MSISDNs or external identifiers corresponding to the UE device(s) for which NIDD communication is being configured. The NIDD authorization also contains a result, which acknowledges acceptance of the NIDD authorization request to SCEF 117. If HSS 128 determines that the list size exceeds the message capacity, HSS 128 will segment the list and send it in multiple messages. The IMSI(s) and, if available, the MSISDN(s) (when the NIDD configuration request contains an external identifier) or if available, external identifier(s) (when the NIDD configuration request contains an MSISDN) are returned by HSS 128 in the NIDD authorization response. These UE identifying parameters (IMSIs, MSISDNs, and external identifiers) allow SCEF 117 to correlate the NIDD context stored for the group of ASs with the PDN connection shared by the ASs to the T6a/T6b connection established for each UE or each group member UE.

In step 2E, SCEF 117 updates the AS group NIDD context record with UE IMSI and grant time. SCEF 117 generates the unique SCS/AS reference ID (TLTRI) for each of the SCS/ASs and stores the SCS/AS reference ID internally associated with each of the SCS/ASs of the group. SCEF 117 will create an association between the TLTRIs of all SCS/ASs of a given SCS/AS group, the corresponding UE identifying parameters (e.g., external group identifier, external identifier, MSISDN, or IMSI) and the PDN connection identifying identifier, such as the evolved packet system bearer identity (EBI) of the non-IP PDN connection, and store all of these parameters in the AS group NIDD context record.

In step 2F, SCEF 117 sends an NIDD Configuration Response (SCS/AS TLTRI (also known as the Reference Idx), Cause) message to each of the SCS/AS in the given group to acknowledge acceptance of the NIDD Configuration Request over the T8 interface.

It should be noted that if an NIDD configuration request is received from one of SCS/ASs 200, 202, and 204, and the request is for deletion of an NIDD configuration, then the corresponding SCS/AS entry from the context is removed from SCEF 117. SCEF 117 responds to the SCS/AS requesting deletion of the NIDD configuration using the T8 interface. However, if there is only one SCS/AS is present in the group when the deletion request is received, then SCEF 117 sends an NIDD authorization delete request to HSS 128 using S6t NIDD information request (NIR) and responds back to the SCS/AS requesting deletion upon receiving an NIDD information answer (NIA) from HSS 128. If the deletion is received from the leader SCS/AS, then leadership is reassigned to another SCS/AS which has requested the next highest NIDD duration.

It should also be noted that if an NIDD configuration request is received from an SCS/AS for updating or modifying an existing NIDD configuration, and the NIDD duration in the NIDD configuration request is greater than the NIDD duration previously stored for the SCS/AS, then SCEF 117 will send an NIDD authorization update request to HSS 128 using an NIR message over the S6t interface. SCEF 117 then updates the received grant time from HSS 128 and responds to the SCS/AS that requested the NIDD configuration update.

Figure 4:
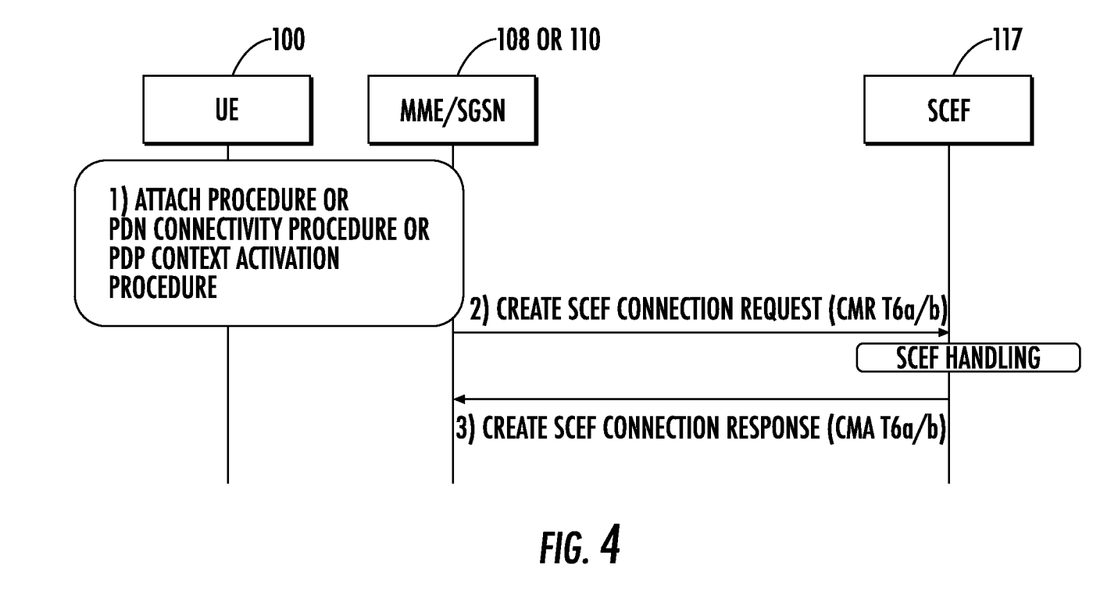
FIG. 4 is a call flow diagram illustrating exemplary messaging for creating a single PDN connection between a SCEF and an MME or SGSN for supporting communication with multiple ASs.

The UE will invoke the T6a/T6b connection establishment procedure as described in 3GPP TS 23.682, clause 5.13 in order to establish a PDN connection for communicating NIDD data to the network. FIG. 4 illustrates the T6a/T6b attach procedure. Referring to FIG. 4, in step 1, UE 100 performs the EPS attach procedure (see 3GPP TS 23.401) with a PDN type of "Non-IP" and subscription information corresponding to either the default APN for PDN type of "Non-IP" or the UE requested APN and also includes the "Invoke SCEF Selection" indicator. In step 2, in response to the EPS attach procedure invoked by UE 100, MME 108 or SGSN 110 initiates a T6a/T6b connection towards SCEF 117 by sending a create connection request message to SCEF 117. The SCEF 117 updates the group SCS/AS NIDD configuration context information for the SCS/AS group that created a configuration for the UE that is attaching to the network (from the NIDD configuration procedure described above with respect to FIG. 3) with the user identity, EPS bearer identity, APN, serving PLMN rate control, protocol configuration options (PCO), serving PLMN ID, international mobile equipment identity software version (IMEISV) received from the connection management request as the part of PDN connection establishment procedure.

In the conventional network architecture illustrated in FIG. 2, the UE is required to invoke the initial attach procedure illustrated in FIG. 4 for each SCS/AS to which the UE is configured to send its data to create a separate PDN connection for NIDD communications to each SCS/AS. However, using the procedures described herein, UE 100 is only required to create a single PDN connection with SCEF 117 to communicate mobile originated NIDD data to a group of SCS/ASs.

Figure 5:
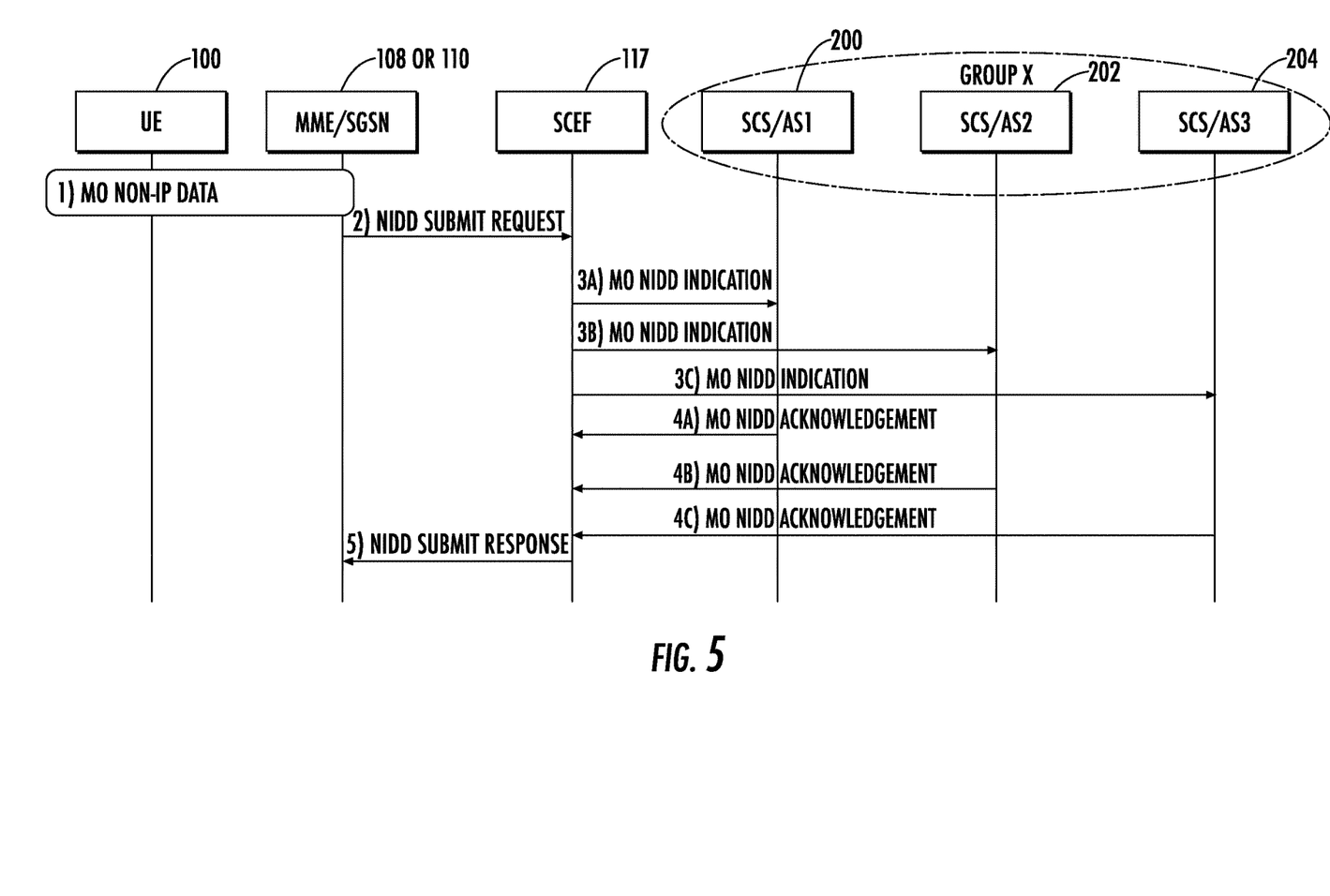
FIG. 5 is a call flow diagram illustrating exemplary messaging for delivering mobile originating messaging from a UE to plural ASs using a single PDN connection.

Once the group SCS/AS NIDD context has been updated to correlate with the PDN connection created by the UE, the single PDN connection can be used by the UE to send mobile originated NIDD data to plural SCS/ASs. FIG. 5 illustrates exemplary steps performed by the various network nodes for mobile originated communication from a UE to a group of SCS/ASs for which SCEF 117 has created and stored a group NIDD context that has been correlated with the PDN connection. Referring to FIG. 5, in step 1, UE 100 sends an MO NIDD message over the non-access stratum (NAS) with an evolved packet system (EPS) bearer ID to MME/SGSN 108 or 110 as described in 3GPP TS 23.682, clause 5.13.4.

In step 2, MME/SGSN 108 or 110 sends an NIDD submit request over the T6a/T6b interface and the shared PDN connection to SCEF 117. The NIDD submit request will include the user identity, EBI, SCEF ID, non-IP data, MO exception data counter as specified in 3GPP TS 23.682.

SCEF 117 receives the NIDD submit request and retrieves the group SCS/AS context information based on the user ID and EBI extracted from the NIDD submit request message. For example, SCEF 117 may utilize the user ID and the EBI to perform a lookup in the AS group NIDD context database maintained by SCEF 117 to locate the AS group NIDD context record created by SCEF 117 for the SCS/AS group. In steps 3A, 3B, and 3C, SCEF 117 transmits NIDD MO indication messages over the T8 interface for each of the SCS/ASs identified as group members in the AS group NIDD context record. The NIDD MO indication messages each include the TLTRI created for the respective SCS/AS for which the message is destined. That is, SCEF 117 replicates the NIDD data received from the UE over the single PDN connection and transmits the NIDD data to each SCS/AS that is included in the AS group NIDD context record for the UE. This procedure can be contrasted with the call flow illustrated in FIG. 2 where the UE sends the same NIDD data over three separate PDN connections to the SCEF, the SCEF maintains three separate NIDD configuration contexts (one for each SCS/AS) and uses the separate NIDD configuration contexts to transmit the NIDD date to each SCS/AS.

Each SCS/AS 200, 202, and 204 receives the MO NIDD data. In steps 4A, 4B, and 4C, each SCS/AS 200, 202, and 204 responds to SCEF 117 with an MO NIDD acknowledgement message as described in Section 5.13.4 of 3GPP TS 23.682. The MO NIDD acknowledgement message may include a cause parameter that indicates whether or not the MO NIDD data was successfully received.

In step 5, SCEF 117 receives the MO NIDD acknowledgement messages from SCS/AS 200, SCS/AS 202, and SCS/AS 204 and, in response, transmits a single NIDD submit response to MME/SGSN 108 or 110 on behalf of all SCS/ASs belonging to the group. Using the conventional procedure illustrated in FIG. 2, SCEF 117 would be required to send a separate NIDD submit response corresponding the MO NIDD acknowledgement message for each SCS/AS. Thus, the procedure illustrated in FIG. 5 reduces the number of NIDD submit response messages transmitted to MME/SGSN 108 or 110 for a group of SCS/ASs configured to receive NIDD data from the same UE by a factor of N−1, where N is an integer equal to the number of SCS/ASs in the group.

It should be noted that if SCEF 117 is not able to deliver MO NIDD message to any of the SCS/ASs, then SCEF 117 may optionally buffer the MO NIDD message and re-attempt delivery of the MO NIDD message to the SCS/AS a configurable number of times before reporting a failed delivery attempt to MME/SGSN 108 or 110 in the NIDD submit response message. If the failed delivery attempt affects all of the SCS/ASs in the group, MME/SGSN 108 or 110 may notify UE 100 of the failure, and UE 100 may retransmit the MO NIDD data. If the UE retransmits the MO NIDD data, delivery of the retransmitted NIDD data may be re-attempted to all of the SCS/ASs in the group using the messages illustrated in FIG. 5.

If the failed delivery attempt affects some but not all of the SCS/ASs in a group, SCEF 117 may report the identities of the SCS/ASs for which the delivery failed in the NIDD submit response message. MME/SGSN 108 or 110 may report the failed delivery to UE 100, and UE 100 may retransmit the NIDD data. When SCEF 117 receives the retransmitted NIDD data, SCEF 117 may only re-attempt transmission of the NIDD data to the SCS/ASs that did not successfully receive the first transmission of the NIDD data. Such stateful operation may be achieved by SCEF 117 maintaining state information in the AS group NIDD context record as to which of the SCS/ASs in the group received the initial transmission of the NIDD data.

Figure 6:
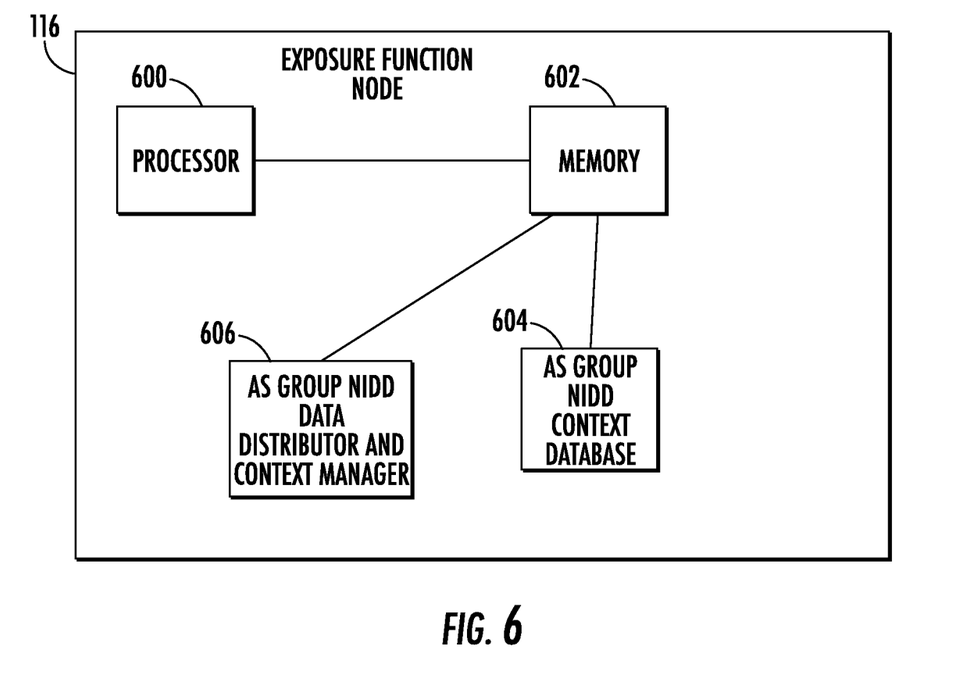
FIG. 6 is a block diagram illustrating an exemplary exposure function node (SCEF or NEF) architecture for supporting communication between a UE and multiple ASs using a single PDN connection.

FIG. 6 is a block diagram illustrating an exemplary exposure function node 116 that may be a SCEF or NEF capable of communicating NIDD data from a single UE to multiple SCS/ASs. Referring to FIG. 6, exposure function node 116 includes at least one processor 600 and a memory 602. Exposure function node 116 further includes an AS group NIDD context database that stores AS group NIDD context records for application server groups for facilitating MO NIDD communications from the UEs to the application server groups. Table 1 shown below illustrates an exemplary AS group NIDD context record that may be created and stored for an application server group in AS group NIDD context database 604.

TABLE 1

Example AS Group NIDD Context Record

| AS Group ID | PDN Connection Information | AS GROUP MEMBERS | NIDD Context Data | Group Leader |
|---|---|---|---|---|
| Group X | User Identity, EPS Bearer Identity, APN, Serving PLMN Rate Control, PCO, Serving PLMN ID, IMEISV | SCS/AS1 | External Group Identifier, External Identifier or MSISDN, SCS/AS Identifier, NIDD Duration, T8 Destination Address, TLTRI, PDN Connection Establishment Option, Reliable Data Service Configuration, MTC Provider Information, Resolved IMSI(s) MSISDNs of UE(s) | Y |
| | | SCS/AS2 | External Group Identifier, External Identifier or MSISDN, SCS/AS Identifier, NIDD Duration, T8 Destination Address, TLTRI, PDN Connection Establishment Option, Reliable Data Service Configuration, MTC Provider Information, Resolved IMSI(s) MSISDNs of UE(s) | N |
| | | SCS/AS3 | External Group Identifier, External Identifier or MSISDN, SCS/AS Identifier, NIDD Duration, T8 Destination Address, TLTRI, Requested Action, PDN Connection Establishment Option, Reliable, Data Service Configuration, MTC Provider Information, Resolved IMSI(s) MSISDNs of UE(s) | N |

In Table 1, the group NIDD context record for AS group X illustrated in FIG. 4 is provided. The group NIDD context record includes the NIDD group name, group X, the PDN connection information for the group, NIDD context information for each AS group member, and whether or not the AS group member is a group leader. In the illustrated example, AS group X has 3 AS group members, SCS/AS1, SCS/AS2, and SCS/AS3. The PDN connection information for the group includes the user identity, EPS bearer identity, APN, serving PLMN rate control, PCO, Serving PLMN ID, and IMEISV.

The NIDD context record stored for each group member includes an external group identifier, external identifier, or MSISDN, which identifies the UE or group of UEs with which the AS group desires to communicate. As stated above, if an external identifier is included in the NIDD configuration request, the HSS will resolve the external identifier into an IMSI or MSISDN of the UE with which the AS desires to communicate. If the NIDD configuration request includes an external group identifier, the HSS may resolve the external group identifier into a list of IMSIs or MSISDNs for the UEs. The resolved UE identifiers are illustrated in Table 1 as "Resolved IMSIs or MSISDNs of UEs".

The AS group NIDD context record in Table 1 further includes the NIDD duration, which is the length of time that the NIDD context is valid for a given AS. As stated above, in one example, the AS with the longest NIDD duration in a particular AS NIDD group may be set as the group leader. In the example in Table 1, SCS/AS1 is assumed to be the NIDD group leader.

The AS group NIDD context record in Table 1 further includes a T8 destination address, which is the destination address of the SCS/AS on the T8 interface. In the example above, separate T8 destination addresses for SCS/AS1, SCS/AS2, and SCS/AS3 would be stored in the AS group NIDD context record for AS group X.

The AS group NIDD context record in Table 1 further includes the TLTRI, which is a parameter created by SCEF 117 to identify the NIDD configuration transaction between SCEF 117 and each SCS/AS. The record for the AS group in the AS group NIDD context database creates and association between the TLTRIs of the ASs that are members of the same group.

The AS group NIDD context record in Table 1 further includes a PDN connection establishment option, which is an optional parameter that is used to indicate what the SCEF should do if the UE, or group member UEs, has not established the PDN connection and MT non-IP data needs to be sent. Example values for the PDN connection establishment option may include values that indicate wait for the UE to establish the PDN connection, respond with an error cause, or send a device trigger.

The AS group NIDD context record in Table 1 optionally includes reliable data service configuration parameters, which are used to configure reliable data service (as defined in clause 4.5.14.3 of 3GPP TS 23.682). The reliable data service configuration parameters include port numbers for originator application(s) and receiver application(s) and the mobile terminated and mobile originated serialization format(s) that are supported by the SCS/AS for each port number.

The AS group NIDD context record in Table 1 further includes MTC provider information parameter, which is an optional parameter that identifies the service provider for MTC communications with a particular UE.

Returning to FIG. 6, exposure function node 116 further includes an AS group NIDD data distributor and context manager 606 that receives MO NIDD submit requests containing MO NIDD data from UEs, performs lookups in AS group NIDD context database 604, locates AS groups corresponding to the UE or UEs identified in the MO NIDD submit requests, and replicates the MO NIDD data to UEs in the group. For example, MO NIDD data distributor and context manager 606, in response to receiving an MO NIDD submit request may extract the user identifier (IMSI, MSISDN, or external identifier) and the EPS bearer identifier from the MO NIDD submit request and use the user identifier and the EPS bearer identifier to perform a lookup in AS group NIDD context database 604. If AS group NIDD data distributor and context manager 606 locates a matching entry corresponding to the user identifier and the EPS bearer identifier in database 604, AS group NIDD data distributor and context manager 606 may replicate and transmit the NIDD data to each AS that is identified in the record as being a member of the group.

Figure 7:
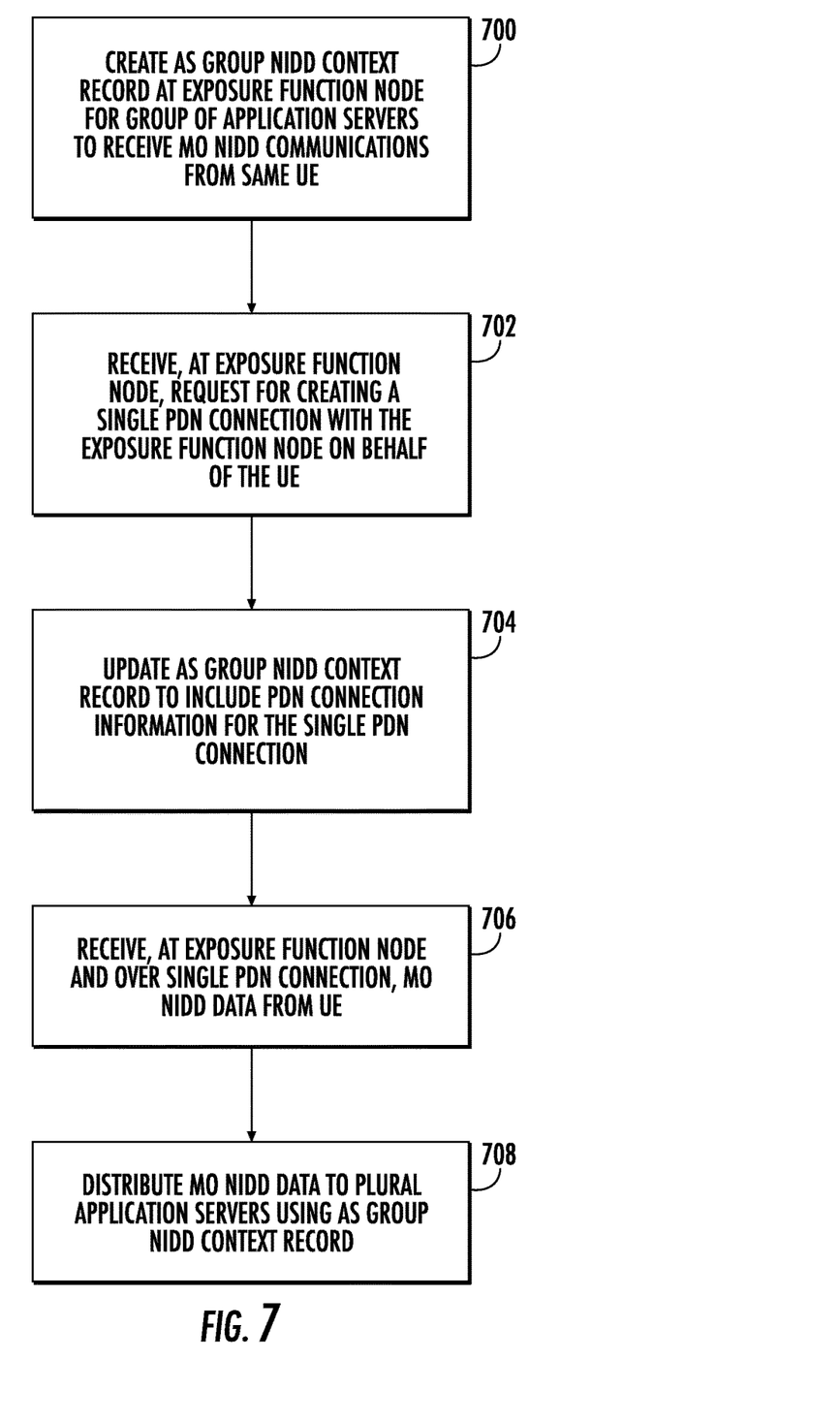
FIG. 7 is a flow chart illustrating an exemplary process for communicating between multiple ASs and a UE using a single PDN connection.

FIG. 7 is a flow chart illustrating an exemplary process for distributing MO NIDD data to plural application servers referring to FIG. 7, in step 700, the process includes creating an AS group NIDD context record at an exposure function node for a group of application servers to receive MO NIDD communications from the same UE. For example, an exposure function node, such as an NEF or SCEF, may be configured (e.g., by the network operator) with an AS group NIDD context record that includes the identities of a group of application servers that desire to communicate with the same UE or UEs. The NEF or SCEF may receive NIDD configuration requests from plural application servers identified as being part of the AS group in the AS group NIDD context record and that desire to communicate with the same UE. In response to the NIDD configuration requests, the SCEF or NEF assign the SCS/AS with the longest NIDD duration to be the group leader, query the HSS to resolve the external Group Id in the NIDD configuration request from the group leader to an external ID or IDs of the UEs with which the SCS/AS desires to communication, and add the external ID or IDs to the AS group NIDD context record. The AS group NIDD context record may be created using AS group NIDD data distributor and context manager 606 illustrated in FIG. 6 and stored in AS group NIDD context database 604.

In step 702, the process includes receiving, at the exposure function node, a request for creating a single PDN connection with the exposure function node on behalf of a UE. For example, an SCEF or NEF may receive a T6a/T6b connection request from an MME, or SGSN serving a particular UE, or SM context create request from SMF in 5G network. In step 704, the process includes updating the AS group NIDD context record to include the PDN connection information received in the request for creating the PDN connection. For example, AS group NIDD data distributor and context manager 606 may update the AS group NIDD context record for the group of ASs that desired to communicate with the same UE to include the user identity, EPS bearer identity, APN, serving PLMN rate control, PCO, serving PLMN ID, and IMEISV received in the PDN connection request.

In step 706, the process includes receiving, at the exposure function node and over the PDN connection, mobile originated NIDD data from the UE. For example, UE 100 may send mobile originated UE data to exposure function node 116 via MME/SGSN 108 or 110 over a single PDN connection between MME/SGSN 108 or 110 and exposure function node 116.

In step 708, the process includes distributing the mobile originated NIDD data to plural application servers using the AS group NIDD context. Step 708 may include locating AS group NIDD context information corresponding to the single PDN connection. For example, AS group NIDD data distributor and context manager 606 may perform a lookup in AS group NIDD context database 604 using the user ID and EPS bearer ID in the NIDD submit request message received from MME/SGSN 108 and locate the corresponding AS group NIDD context record. AS group NIDD data distributor and context manager 606 may then extract address information from the AS group NIDD context record for each AS that is a member of the AS group. The address information may include the T8 destination address of each AS or SCS/AS stored in the AS group NIDD context record. AS group NIDD data distributor and context manager 606 may then formulate and transmit MO NIDD indication messages including the MO NIDD data to each of the ASs and/or SCS/ASs that are members of the group using the destination addresses located in the AS group NIDD context record.

Thus, rather than requiring separate PDN connection and contexts for each AS or SCS/AS that receives mobile originated NIDD data from the same UE, the subject matter described herein allows plural ASs and/or SCS/ASs to receive mobile originated NIDD data over the same PDN connection and uses a single AS group NIDD context record to identify and delivery the MO NIDD data to the SCS/ASs. The UE is not required to establish maintain multiple PDN connections or to communicate duplicate MO NIDD data over the PDN connections. As a result, if the UE is an IoT device, such as a sensor, that operates on batter power, the utilization of the battery power will be reduced over the conventional NIDD approach illustrated in FIG. 2. In addition, the signaling required to establish, maintain, and tear down PDN connections is reduced over the implementation illustrated in FIG. 2. This method also avoids additional signaling at RAN and core network nodes like MME, SCEF and HSS for 4G network. Also, 5G NR and 5G core nodes, such as the AMF, unified data management (UDM), SMF, NEF for the 5G network.

The disclosure of each of the following references is hereby incorporated herein by reference in its entirety.

REFERENCES 1. 3GPP TS 29.122; Technical Specification Group Core Network and Terminals; T8 reference point for Northbound APIs; (Release 16) V16.3.0 (2019-09).
2. 3GPP TS 23.682; Technical Specification Group Services and System Aspects; Architecture enhancements to facilitate communications with packet data networks and applications; (Release 16) V16.4.0 (2019-09)
3. 3GPP TS 29.336; Technical Specification Group Core Network and Terminals; Home Subscriber Server (HSS) diameter interfaces for interworking with packet data networks and applications (Release 15) V15.7.0 (2019-09).
4. 3GPP TS 29.128; Technical Specification Group Core Network and Terminals; Mobility Management Entity (MME) and Serving GPRS Support node (SGSN) interfaces for interworking with packet data networks and applications.
5. 3GPP TS 23.401; Technical Specification Group Services and System Aspects; General Packet Radio Service (GPRS) enhancements for Evolved Universal Terrestrial Radio Access Network (E-UTRAN) access (Release 16) V16.4.0 (2019-09).

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for mobile originated (MO) non-Internet protocol data delivery (NIDD) to plural application servers (ASs), the method comprising:
creating an AS group NIDD context record at an exposure function node for an AS group including a plurality of ASs to receive MO NIDD communications from a same UE;
receiving, at the exposure function node, a request for creating a single packet data network (PDN) connection with the exposure function node on behalf of the UE;
updating the AS group NIDD context record to include PDN connection information for the single PDN connection;
receiving, at the exposure function node and over the single PDN connection, MO NIDD data from the UE; and
distributing, from the exposure function node and using the AS group NIDD context record, the MO NIDD data to each of the plural ASs identified as members of the AS group in the AS group NIDD context record.

2. The method of claim 1 wherein the exposure function node comprises a service capability exposure function (SCEF).

3. The method of claim 1 wherein the exposure function node comprises a network exposure function (NEF).

4. The method of claim 1 wherein creating the AS group NIDD context record comprises configuring the exposure function node with identities of the ASs that desire to communicate with the same UE and wherein the method further comprises:
receiving, from each of the plurality of ASs, an NIDD configuration request message;
assigning one of the ASs to be a group leader;
resolving an external group identifier in the NIDD configuration request for the AS assigned to be the group leader into an external identifier for the UE; and
storing the external identifier for the UE in the AS group NIDD context record in an AS group NIDD context database maintained by the exposure function node.

5. The method of claim 1 wherein updating the AS group NIDD context record comprises:
extracting, from the request for creating the single PDN connection, an evolved packet system (EPS) bearer ID for identifying the PDN connection; and
storing the EPS bearer ID in the AS group NIDD context record.

6. The method of claim 1 wherein receiving the MO NIDD data from the UE includes receiving a single NIDD submit request message from a mobility management entity (MME), a serving general packet radio service support node (SGSN), or an session management function (SMF).

7. The method of claim 1 wherein distributing the MO NIDD data using the AS group NIDD context record comprises:
extracting an evolved packet system (EPS) bearer ID from a message carrying the MO NIDD data;
accessing the AS group NIDD context record using the EPS bearer ID extracted from the message carrying the MO NIDD data;
extracting, from the AS group NIDD context record, address information for each of the ASs in the AS group; and
transmitting an MO NIDD indication message containing the MO NIDD data to each of the ASs using the address information extracted from the AS group NIDD context record.

8. The method of claim 1 wherein the ASs in the AS group include at least one AS that is directly connected to the exposure function node without an intermediate service capability server (SCS).

9. The method of claim 1 wherein the ASs in the AS group include at least one AS that is connected to the exposure function node via an intermediate service capability server (SCS).

10. The method of claim 1 comprising:
determining that one of the ASs in the AS group is unavailable;
buffering the MO NIDD data at the exposure function node; and
reattempting delivery of the MO NIDD data to the one AS.

11. A system for mobile originated (MO) non-Internet protocol data delivery (NIDD) to plural application servers (ASs), the system comprising:
an exposure function node including at least one processor and a memory; and
an AS group NIDD data distributor and context manager implemented by the at least one processor for creating an AS group NIDD context record at the exposure function node for an AS group including a plurality of ASs to receive MO NIDD communications from a same UE, receiving a request for creating a single packet data network (PDN) connection with the exposure function node on behalf of the UE, updating the AS group NIDD context record to include PDN connection information for the single PDN connection, receiving, over the single PDN connection, MO NIDD data from the UE, and, distributing, from the exposure function node and using the AS group NIDD context record, the MO NIDD data to each of the plural ASs identified as members of the group in the AS group NIDD context record.

12. The system of claim 11 wherein the exposure function node comprises a service capability exposure function (SCEF) or a network exposure function (NEF).

13. The system of claim 11 wherein the AS group NIDD data distributor and context manager is configured to:
store, in the AS group NIDD context record, identities of the ASs that desire to communicate with the same UE;
receive from each of the plurality of ASs, an NIDD configuration request message;
assign one of the ASs to be a group leader;
resolving an external group identifier in the NIDD configuration request for the AS assigned to be the group leader into an external identifier for the UE; and
storing the external identifier for the UE in the AS group NIDD context record in an AS group NIDD context database maintained by the exposure function node.

14. The system of claim 11 wherein the AS group NIDD data distributor and context manager is configured to:
extract, from the request for creating the single PDN connection, an evolved packet system (EPS) bearer ID for identifying the PDN connection; and
store the EPS bearer ID in the AS group NIDD context record.

15. The system of claim 11 wherein the AS group NIDD data distributor and context manager is configured to receive a single NIDD submit request message from a mobility management entity (MME), a serving general packet radio service support node (SGSN), or an session management function (SMF).

16. The system of claim 11 wherein the AS group NIDD data distributor and context manager is configured to:
extract an evolved packet system (EPS) bearer ID from a message carrying the MO NIDD data;
access the AS group NIDD context record using the EPS bearer ID extracted from the message carrying the MO NIDD data;
extract, from the AS group NIDD context record, address information for each of the ASs in the AS group; and
transmit an MO NIDD indication message containing the MO NIDD data to each of the ASs using the address information extracted from the AS group NIDD context record.

17. The system of claim 11 wherein the network exposure function is configured to connect directly to at least one of the ASs in the group of ASs without an intermediate service capability server (SCS).

18. The system of claim 11 wherein the network exposure function node is configured to connect to at least one of the ASs in the group of ASs via an intermediate service capability server (SCS).

19. The system of claim 11 wherein the AS group NIDD data distributor and context manager is configured to:
determine that one of the ASs in the AS group is unavailable;
buffer the MO NIDD data at the exposure function node; and
reattempt delivery of the MO NIDD data to the one AS.

20. A non-transitory computer readable medium having stored thereon executable instructions that when executed by a processor of a computer control the computer to perform steps comprising:
creating an application server (AS) group non-Internet protocol data delivery (NIDD) context record at an exposure function node for an AS group including a plurality of ASs to receive MO NIDD communications from a same UE;
receiving, at the exposure function node, a request for creating a single packet data network (PDN) connection with the exposure function node on behalf of the UE;
updating the AS group NIDD context record to include PDN connection information for the single PDN connection;
receiving, at the exposure function node and over the single PDN connection, MO NIDD data from the UE; and
distributing, from the exposure function node and using the AS group NIDD context record, the MO NIDD data to each of the plural ASs identified as members of the group in the AS group NIDD context record.

* * * * *

UNITED STATES PATENT AND TRADEMARK OFFICE
CERTIFICATE OF CORRECTION

PATENT NO. : 11,140,523 B2  
APPLICATION NO. : 16/656535  
DATED : October 5, 2021  
INVENTOR(S) : Mahalank et al.

Page 1 of 1

It is certified that error appears in the above-identified patent and that said Letters Patent is hereby corrected as shown below:

On the Title Page

Item (54) and in the Specification, Column 1, Line 5, Title:  
Replace "APPLICATION SERVERS (ASS)"  
With -- "APPLICATION SERVERS (ASs)" --.

Signed and Sealed this  
Twenty-eighth Day of December, 2021

Drew Hirshfeld  
*Performing the Functions and Duties of the*  
*Under Secretary of Commerce for Intellectual Property and*  
*Director of the United States Patent and Trademark Office*